May 22, 1945.                J. B. CLARK ET AL                 2,376,418
         PROCESS OF AND MEANS FOR TREATING LUBRICATING
               OIL OF INTERNAL-COMBUSTION ENGINES
                      Filed Dec. 4, 1941

INVENTORS.
Joel B. Clark
and
Harry P. Pierce
by Parker, Rockwood & Parker
              ATTORNEYS.

Patented May 22, 1945

2,376,418

UNITED STATES PATENT OFFICE 2,376,418

PROCESS OF AND MEANS FOR TREATING LUBRICATING OIL OF INTERNAL-COMBUSTION ENGINES

Joel B. Clark and Harry P. Pierce, Buffalo, N. Y.; said Pierce assignor to said Clark Application December 4, 1941, Serial No. 421,616

8 Claims. (Cl. 252—358)

This invention relates to processes and materials for cleaning and reconditioning lubricating oils, and particularly oils used for lubricating internal combustion engines.

The oil employed in the crank case or oil pan of an internal combustion engine accumulates foreign materials or substances during the operation of the engine, including, for example, carbon, metal particles, and road dirt. In order to remove foreign matter of this type from the lubricating oil, oil filters of various types have heretofore been used on internal combustion engines in such a manner that the lubricating oil is continuously subjected to filtration during the operation of the engine. Such filters must necessarily be of a type through which the oil passes readily, since only the pressure of the oil circulating pump of the engine is available for forcing the oil through the filter. Consequently, the filtermasses used on such filters remove from the oil only particles of relatively large size. The smaller or microscopic particles of foreign matter pass through the filter and remain in suspension in the oil, and in many cases, this suspension is a colloidal one. These small particles of foreign matter are, consequently, repeatedly passed through the lubricating system of an engine, and consequently, cause wear and abrasion of the relatively moving parts of the engine. Furthermore, these colloidal substances in the lubricating oil tend to collect and form a sludge which interferes with the proper circulation of the oil in the engine, and also the sludge tends to adhere to various bearing surfaces of the engine, and to parts of the cylinders and pistons where they cause deposits of carbon and other materials.

While it may be possible to separate these particles of microscopic sizes from the lubricating oil of an engine by means of filter presses and absorbent materials, yet it is obvious that such devices cannot be installed on internal combustion engines. Consequently, during the use of lubricating oil in an internal combustion engine equipped with a filter of ordinary type, such as heretofore used on such engines, the accumulation of foreign matter continues throughout the use of the oil in the engine, and after the oil has been used for a period of time, it is abrasive and contains much sludge. Hence it has been necessary heretofore to discard the crank case oil in an internal combustion engine at regular intervals, regardless of whether or not a filter is used on the engine, and even when oil is changed at regular intervals, the new oil begins immediately to accumulate foreign material and before it is discarded, it has become quite destructive of the bearing parts of the engine.

One of the objects of this invention is to provide a process by means of which the lubricating oil of an internal combustion engine may be continuously maintained substantially free from foreign material, even of microscopic sizes, so that abrasion due to such foreign material is eliminated or greatly reduced. Another object of this invention is to provide a process of continuously treating lubricating oil during its use in an internal combustion engine so as to cause minute particles of foreign material in the oil to become agglomerated into particles of larger size which can be removed in a filter of the type readily available for use on an internal combustion engine. A further object of this invention is to provide a process of removing foreign materials of finely divided form from lubricating oil during the use of the same in an internal combustion engine in such a manner as to break down colloidal suspensions of the foreign material and to remove them by filtration, thus avoiding the formation of sludge in the engine.

It is also an object of this invention to provide a material which may be added to lubricating oil for the purpose of causing flocculation or agglomeration of foreign material in the lubricating oil. A further object of this invention is to provide a material which, when added to lubricating oil, breaks down any emulsions of foreign material in the oil, to prevent the formation of a scum or similar substance which interferes with the proper operation of the lubricating system of an engine.

Another object of this invention is to provide a filter material or mass for use on an internal combustion engine and which contains a material capable of producing flocculation or agglomeration of finely divided foreign particles carried by the oil. A further object of this invention is to provide a filter cartridge which may be readily inserted into or removed from the lubricating system of an internal combustion engine, and which contains a filtermass through which lubricating oil may be readily forced by the oil circulating pump of the engine and which carries a quantity of material capable of causing agglomeration of particles of foreign material in the lubricating oil.

Other objects and advantages of this invention will be apparent from the following description and claims.

The improved process comprises essentially two steps which are carried on during the operation of the engine containing the lubricating oil to be treated. The first of these steps includes the reacting of the oil with a material which is chemically inert with reference to lubricating oils and metals, and which causes the fined divided particles of foreign material in the oil to flocculate or agglomerate, thus forming particles of larger size. The second step of this process comprises removing from the oil, continuously during the operation of the engine, the agglomerated particles of foreign material, shortly after they have become agglomerated. This removal of the foreign material may, for example, be effected by filtering the oil in the usual manner. Consequently, no scum will be formed in the oil pan or crank case and the oil will be at all times substantially free from foreign matter which might cause damage or abrasion in the engine.

In carrying out the first step of the process, any suitable material or materials may be employed which have the property of causing the finely divided particles of foreign material held in suspension in the oil to flocculate or come together in relatively large masses so that they may be trapped by the filter. The ordinary filter commonly used in connection with internal combustion engines employs a fibrous material, such as cotton waste, as the filtermass, and obviously such material cannot remove from the oil flowing through it the microscopic particles of foreign materials, but by bringing these particles together in groups, the larger bodies thus formed may be readily removed from the lubricating oil by the filter. This flocculating or agglomerating of colloidally suspended microscopic particles of foreign material is similar to the effect of breaking an emulsion, which is generally considered to be a process involving the neutralization of electric charges. The foreign particles suspended in dirty oil have positive electric charges upon them, and since these particles all are similarly charged, they repel each other. Consequently, the substance used for causing the particles of foreign material to agglomerate should have a negatively charged group so as to overcome the positive charges of the particles of foreign material. Preferably the substance employed for causing flocculation or agglomeration of foreign material contain polar molecules, such as those of alcohols, which have a negative hydroxyl or OH group at one end and a positive alkyl group at the other end. These polar molecules tend to orient themselves with the negative or hydrophilic group toward the small positively charged particles of foreign material and with the lipophile or positive group toward the oil. Thus the negative hydroxyl group of the alcohol molecule, by virtue of its residual valences, neutralizes the effect of the positive charges on the small particles of foreign material. The repellent force of the like charges being neutralized, the particles now come together in larger masses.

Any substance having the property of causing the microscopic particles of foreign material to agglomerate and which is compatible with the lubricating oil and which does not detract from the lubricating properties of the oil, nor injure any parts of the engine, may be used in carrying out this invention. Isopropyl alcohol and glycerine have been found to be very effective in producing agglomeration of these foreign particles, the glycerine having the property of causing agglomeration in a more pronounced degree than the isopropyl alcohol, due probably to the fact that glycerine has three hydroxyl groups to each molecule. Since glycerine tends to separate from oil, the most satisfactory results are obtained when the glycerine is introduced in the form of an alcoholic solution, such, for example, as a 5 per cent solution of glycerine in isopropyl alcohol.

Since isopropyl alcohol is not miscible with lubricating oils of the viscosities commonly used in internal combustion engines, the isopropyl alcohol is preferably introduced into the solution by mixing it with a suitable carrier, such for example as a light bodied mineral oil, pale oil having been found very satisfactory for this purpose. Benzol or similar liquids may be employed either with or without the pale oil to act as a carrier for the isopropyl alcohol. When benzol alone is used with isopropyl alcohol with or without glycerine dissolved therein, about one part of benzol to four parts of isopropyl alcohol should be employed.

By way of example, the following formula has been successfully used to cause agglomeration of finely divided foreign particles in crank case or lubricating oil of internal combustion engines:

15% of a 10% solution of naphthalene in benzol
60% of a 5% solution of glycerine in isopropyl alcohol
25% of a #100 zero pale oil In this formula, the naphthalene produces an odor which is useful in determining whether or not the lubricating oil, after a period of use, retains sufficient material to cause agglomeration of foreign matter in the oil, and the naphthalene also has beneficial effects on the lubricating oil. It is not essential, however, to this invention to include the naphthalene in the agglomerating material, and it may be entirely omitted, or may be replaced by some other material or materials. The benzol acts as a carrier for the naphthalene and for the isopropyl alcohol to prevent this alcohol from separating from the crank case oil and facilitates the mixing of the isopropyl alcohol with the main body of the oil in the crank case. The actions of the isopropyl alcohol and glycerine on the lubricating oil have been described. The glycerine may be omitted from this formula, if desired, but as before stated, the glycerine is very effective in causing flocculation or agglomeration of foreign particles. The glycerine also acts as a dehydrator, since it has a great affinity for water.

While only glycerine and isopropyl alcohol are herein specifically referred to as materials suitable for producing agglomeration of foreign particles in the lubricating oil, it will be obvious that it is not intended to limit this process to the particular materials herein described, since any other substances having the property of producing agglomeration or flocculation of particles of foreign material in the oil may be employed in place of the isopropyl alcohol and glycerine.

In preparing the agglomerating material according to the example given, the glycerine is first dissolved in the isopropyl alcohol and this solution can then be mixed with the pale oil or with benzol. If the naphthalene solution in benzol is used, it may be added to the mixture of pale oil, glycerine and alcohol. Instead of using pale oil or other light bodied oil, isopropyl alcohol, with or without glycerine may be mixed with benzol and this mixture introduced into the lubricating oil, but preferably pale oil is used, since it delays the evaporation of the alcohol in the crank case or oil pan.

Agglomerating substances may be introduced into the lubricating oil of an internal combustion engine in any suitable or desired manner. These materials may, for example, be added to lubricating oil by the manufacturer of the oil, or they may be added to the oil when the same is introduced into the crank case of an engine. The agglomerating substance may be added to lubricating oil in any suitable or desired quantities. It has been found that in the case of the formula stated by way of example, that if sufficient of the agglomerating liquid is added so that the quantity of glycerine and isopropyl alcohol constitutes about one half of one per cent of the lubricating oil of the engine, the best results are obtained. Slightly more or less may, however, be employed. Other agglomerating materials may be used, provided they are of such a nature as to be in no way injurious to any of the parts of the engine on which they are used, and provided that these materials do not decrease or adversely affect the lubricating properties of the oil.

Very satisfactory results can be produced by incorporating the agglomerating substance or substances in the filtermass or cartridge, so that, whenever the filtermass or cartridge of an oil filter is changed, the desired quantity of agglomerating material is supplied to the lubricating system of the engine. Since the alcohol and benzol are volatile, it is, of course, obvious that the agglomerating material will eventually become volatilized, and consequently, by replacing the filtermass from time to time, the material removed from the oil will be removed with the old filtermass, and a new charge of agglomerating material will be introduced. In this manner, the oil in an engine may be kept constantly clear and serviceable and the periodic draining of the crank case or oil pan, which is now common practice, can be eliminated, if desired.

The accompanying drawing illustrates, by way of example, how the agglomerating substance may be introduced into the lubricating oil of an engine by incorporating the same in the filtering material of an engine oil filter.

Figure 1:
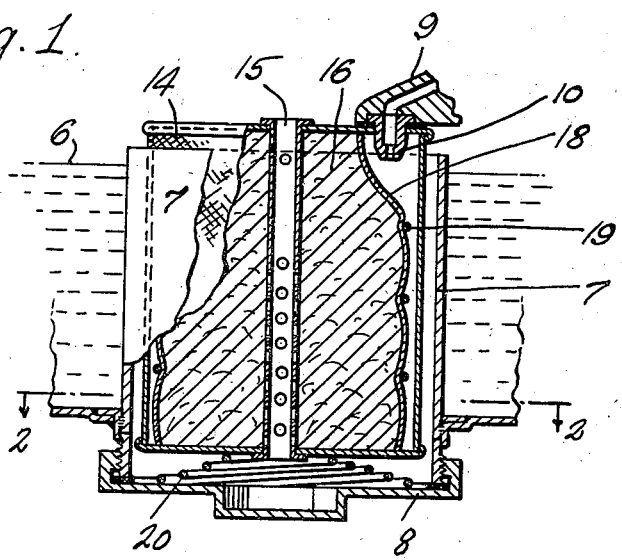
Fig. 1 is a longitudinal sectional elevation of a portion of the crank case or oil pan of an internal combustion engine, and of a filter applied thereto, in which the agglomerating material embodying this invention may be incorporated.

The filter illustrated in the drawing is one of a type which is arranged in the crank case or oil pan of an engine, but it will be understood that the agglomerating material may be incorporated in the filtermass of any suitable or desired type of oil filter.

In the drawing, 5 represents the oil pan or crank case of an engine, which acts as a reservoir for the lubricating oil, the upper level of which is indicated at 6. The oil pan has a partition or substantially cylindrical wall 7 arranged therein, the lower portion of the wall being secured to the oil pan 5 and preferably the wall extends above the oil level 6. A portion of this wall may extend below the oil pan and may be provided with screw threads or other suitable means for receiving a closure cap 8. 9 represents an arm or conduit having an oil discharge duct and provided with a discharge nozzle or orificed member 10.

The construction described is intended for use in connection with a removable filter cartridge which may be of any suitable or desired construction, that shown including a suitable container or can 14, which is preferably imperforate except for two openings arranged substantially centrally in the end walls of the can or container and through which a perforated tube 15 extends. 16 represents the filtermass which may be made of any suitable material, such as fibrous material, for example, cotton waste, this material being packed about the central perforated tube 15. The filter material may be surrounded at its outer surface with a layer 18 of suitable woven material or fabric which may be held in place by means of cords or tie strings 19, so that the outer edge of the filtermass is spaced from the cylindrical wall of the container 14. The ends of the mass of filter material are pressed against the heads or ends of the can or container.

The can or container 14 of the cartridge is provided in the upper wall or head with an aperture through which the nozzle 10 may enter to discharge oil into the space between the outer surface of the filtermass 16 and the cylindrical wall of the container. A spring 20 is preferably disposed between the bottom of the cartridge and the removable cap 8 for pressing the cartridge upwardly into its operative position in which the nozzle 10 extends through the hole in the top of the cartridge. When oil enters through the arm or conduit 9, it passes into the space between the outer surface of the filtermass 16 and the cylindrical wall of the container wall 14, and then passes through the filtermass and into the perforated tube 15, the outer ends of which are open, so that the filtered oil will pass into the interior of the partition or wall 7, from which it may overflow into the body of oil in the crank case or oil pan 5.

A convenient manner of supplying the agglomerating material to the engine is to incorporate the agglomerating material in the filtermass 16 in any suitable or desired manner. For example, if the agglomerating material is in liquid form, the desired quantity of the material may be poured on the filtermass of a cartridge so that it will be absorbed thereby. This may also be accomplished by submerging the filtermass, before it is placed into the container 14 of the cartridge, in the agglomerating liquid, and then squeezing out excess liquid.

In the operation of a filter in which the filtermass contains the agglomerating liquid, the oil entering the filter carries most of the agglomerating liquid out of the filtermass and into the oil pan, where it becomes mixed with the oil in the oil pan. The finely divided microscopic particles of carbon, road dirt, metal and the like, and water, which are mixed with the oil are caused by the agglomerating liquid to come together into larger particles as herein described. This action is probably assisted by heat and agitation. As the oil pump circulates the oil through the filter, the filtermass is now able to trap the larger particles and remove them from the body of oil. Thus the solid particles are removed from the oil together with the water. In the course of time, the heat of the motor drives off the benzol and the isopropyl alcohol and the glycerine is either absorbed by the filtermass or falls with the water into the sump or space below the cartridge, at the removable cap 20.

The addition of this agglomerating material to the filtermass of a filter cartridge is a very satisfactory way of supplying this agglomerating material to the oil, for the reason that in this manner, by merely removing the filter cartridge when the oil becomes dark in appearance, and replacing it by a new filter cartridge, the oil is supplied with a fresh charge of agglomerating liquid at the same time that a new filtermass is applied. Since the agglomerating material becomes used up or dissipated at about the same time that the filter cartridge begins to become plugged with material removed from the oil, it is desirable to replenish both the agglomerating material and the filtermass at the same time.

We have also found that if the agglomerating material is incorporated into filtermass, a carrier for this material, such for example as the light bodied mineral oil or the benzol may be omitted. For example, a solution of glycerine in isopropyl alcohol may be incorporated in the filtermass without any carrier. When this is done, the same agglomerating action takes place, either due to the carrying of isopropyl alcohol into the oil pan where it is mixed with the main body of the oil, or the electrical charges of the particles of foreign matter of the oil may be neutralized in the filtermass itself. Agglomeration of these particles may, consequently, takes place within the filtermass, or in the oil pan, or in both places, since it is probable that the isopropyl alcohol, when absorbed by the filtermass may become, at least to some extent, mixed with the lubricating oil, while the glycerine, which is a very active agglomerating agent, may remain in the filtermass.

The improvements embodying this invention have the advantage of keeping the oil continuously clean and clear. Since the objectionable solid material is continuously removed from the oil by means of this invention, it follows that the oil remains clean and in good condition as long as it remains in the engine. It is, consequently, not necessary to periodically drain the crank case oil and replace it with fresh oil, since the lubricating properties of the oil are not lost by use of the same, and in fact, are claimed by some authorities to improve with use. Consequently, the filter shown in the drawing is particularly well adapted for use with this invention, since when the filter cartridge is to be removed and replaced by another, the cap 20, upon removal from the oil pan, permits only the oil within the partition or wall 7 to be drained from the oil pan, the remainder of the oil being retained in the oil pan by the partition 7.

Figure 2:
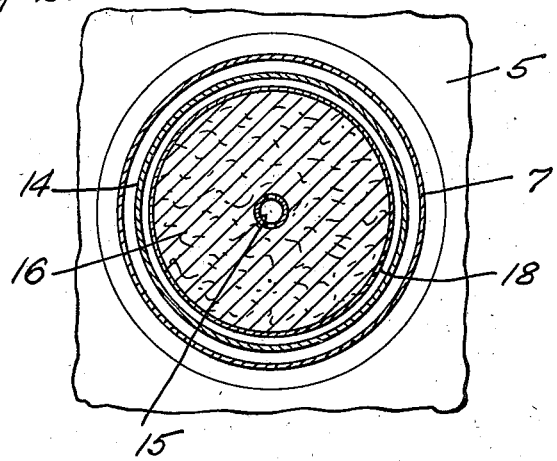
Fig. 2 is a sectional plan view thereof, on line 2—2, Fig. 1.

When the process embodying this invention is applied to an internal combustion engine, it is merely necessary to check the oil from time to time, for example, by means of the usual oil stick, to make sure that the oil is at the proper level and at the same time, the oil can be examined for cleanliness. When the process embodying this invention is in operation, the oil will remain clear or clean and be of similar appearance to the oil originally supplied to the engine. If the oil or the oil stick is dark in appearance, this indicates that the agglomerating material and the filter cartridge need replacing. Consequently, if the filter is of the type illustrated in Figs. 1 and 2, the cap 20 is removed, thus permitting the oil filter cartridge to drop out so that another cartridge may be inserted. Very shortly after a new cartridge and a new charge of agglomerating material are supplied to the engine, the dark color of the oil will disappear and the oil again becomes similar in color and clearness to the oil originally supplied to the engine.

As a result of the operation of the process embodying this invention, the engine lubricating oil at no time contains more than an extremely small quantity of foreign material, since the oil is continuously acted upon by the agglomerating material and is continually being subjected to filtration. Consequently, the improved process herein described not only results in a material saving in oil, but also greatly reduces the wear on the engine due to the abrasive action of particles of solid matter contained in the oil. Furthermore, by continuously removing the minute particles of foreign materials from the oil, no scum or thick material is deposited in the oil pan of the engine, which scum sometimes causes clogging or interferes with the circulation of oil in the engine.

We claim as our invention:

1. A process of treating a lubricating oil during its use in an internal combustion engine, which comprises the steps of adding to the lubricating oil a mixture of isopropyl alcohol and a carrier therefor which is miscible with said luricating oil, to cause agglomeration of colloidal particles of foreign material in said lubricating oil, and filtering the oil during the operation of the engine to remove the agglomerated foreign material from the oil.

2. A process of treating a lubricating oil during its use in an internal combustion engine, which comprises the steps of adding to the lubricating oil a mixture of isopropyl alcohol and a light bodied mineral oil, said alcohol causing agglomeration of colloidal particles of foreign material in said lubricating oil, and filtering the oil during the operation of the engine to remove the agglomerated foreign material from the oil.

3. A process of treating a lubricating oil during its use in an internal combustion engine, which comprises the steps of adding to the lubricating oil a mixture of isopropyl alcohol and glycerine with a carrier therefor which is miscible with said lubricating oil, to cause agglomeration of colloidal particles of foreign material in said lubricating oil, and filtering the oil during the operation of the engine to remove the agglomerated foreign material from the oil.

4. A material for addition to lubricating oil of internal combustion engines to cause agglomeration of foreign particles therein, to enable them to be removed by filtration, consisting essentially of a mixture of glycerine and isopropyl alcohol mixed with a liquid bodied mineral oil.

5. A filtermass for use with an internal combustion engine for filtering the lubricating oil thereof during the use of the invention, said filtermass comprising an oil permeable fibrous body impregnated with a liquid including isopropyl alcohol and a carrier therefor which is miscible with the lubricating oil, to produce agglomeration of particles of foreign material contained in the oil.

6. A filtermass for use with an internal combustion engine for filtering the lubricating oil thereof, said filtermass comprising an oil permeable body impregnated with a liquid including glycerine and a carrier therefor which is miscible with the lubricating oil, to produce agglomeration of particles of foreign material contained in the oil.

7. A filtermass for use with an internal combustion engine for filtering the lubricating oil thereof, said filtermass comprising a fibrous body having glycerine absorbed therein.

8. A filtermass for use with an internal combustion engine for filtering the lubricating oil thereof, said filtermass comprising a fibrous body having isopropyl alcohol absorbed therein.

JOEL B. CLARK.
HARRY P. PIERCE.